(12) United States Patent
Nivon et al.

(10) Patent No.: US 7,573,640 B2
(45) Date of Patent: Aug. 11, 2009

(54) MULTI-PLANE OPTICAL APPARATUS

(75) Inventors: Uzia Nivon, Moshav Kidron (IL); Yehuda Niv, Nes Ziona (IL)

(73) Assignee: Mirage Innovations Ltd., Petach-Tikva (IL)

(*) Notice: Subject to any disclaimer, the term of this patent is extended or adjusted under 35 U.S.C. 154(b) by 0 days.

(21) Appl. No.: 11/155,503

(22) Filed: Jun. 20, 2005

(65) Prior Publication Data
US 2006/0221448 A1 Oct. 5, 2006

Related U.S. Application Data

(60) Provisional application No. 60/667,773, filed on Apr. 4, 2005.

(51) Int. Cl.
*G02B 27/14* (2006.01)
*G02B 27/44* (2006.01)

(52) U.S. Cl. .................. 359/630; 359/568; 345/7

(58) Field of Classification Search ............ 359/13, 359/15, 568, 572, 569, 834, 837, 629, 630, 359/633; 385/129–132; 345/7–9
See application file for complete search history.

(56) References Cited

U.S. PATENT DOCUMENTS

| | | | |
|---|---|---|---|
| 4,410,237 A | 10/1983 | Veldkamp | |
| 4,441,974 A | 4/1984 | Nishikawa et al. | |
| 4,711,512 A | 12/1987 | Upatnieks | |
| 4,805,988 A | 2/1989 | Dones | |
| 4,931,158 A | 6/1990 | Bunshah et al. | |
| 5,082,629 A | 1/1992 | Burgess et al. | |
| 5,224,198 A | 6/1993 | Jachimowicz et al. | |
| 5,237,451 A | 8/1993 | Saxe | |
| 5,441,570 A | 8/1995 | Hwang | |
| 5,469,185 A | 11/1995 | Lebby et al. | |
| 5,503,875 A | 4/1996 | Imai et al. | |
| 5,619,373 A | 4/1997 | Meyerhofer et al. | |
| 5,682,255 A | 10/1997 | Friesem et al. | |
| 5,693,197 A | 12/1997 | Lal et al. | |
| 5,742,262 A | 4/1998 | Tabata et al. | |
| 5,761,177 A | 6/1998 | Muneyoshi et al. | |
| 5,835,661 A | 11/1998 | Tai et al. | |
| 5,966,223 A | 10/1999 | Friesem et al. | |
| 6,008,941 A | 12/1999 | Feldman et al. | |
| 6,197,486 B1 | 3/2001 | Majumdar et al. | |

(Continued)

FOREIGN PATENT DOCUMENTS

EP 1031870 8/2000

(Continued)

OTHER PUBLICATIONS

Shechter et al. "Compact Beam Expander with Linear Gratings", Dept. of Physics of Complex Systems, Weizman Institute Of Science.

(Continued)

*Primary Examiner*—Alessandro Amari

(57) ABSTRACT

An optical apparatus for transmitting light having a spectrum of wavelengths is disclosed. The apparatus comprises a plurality of optical devices design and constructed to decompose the light into a plurality of portions, respectively corresponding to different sub-spectra of the spectrum, such that each portion of the light is transmitted within a different optical device.

63 Claims, 5 Drawing Sheets
(4 of 5 Drawing Sheet(s) Filed in Color)

U.S. PATENT DOCUMENTS

| | | | |
|---|---|---|---|
| 6,207,361 | B1 | 3/2001 | Greener et al. |
| 6,436,619 | B1 | 8/2002 | Majumdar et al. |
| 6,465,140 | B1 | 10/2002 | Majumdar et al. |
| 6,487,012 | B1 | 11/2002 | Khoshnevis et al. |
| 6,492,269 | B1 | 12/2002 | Liu et al. |
| 6,566,033 | B1 | 5/2003 | Majumdar et al. |
| 6,570,172 | B2 | 5/2003 | Kim et al. |
| 6,580,529 | B1 | 6/2003 | Amitai et al. |
| 6,611,385 | B2 | 8/2003 | Song |
| 6,638,409 | B1 | 10/2003 | Huang et al. |
| 6,757,105 | B2 | 6/2004 | Niv et al. |
| 6,787,463 | B2 | 9/2004 | Mardian et al. |
| 6,805,490 | B2 * | 10/2004 | Levola ................. 385/67 |
| 6,808,978 | B2 | 10/2004 | Kim |
| 6,822,770 | B1 | 11/2004 | Takeyama |
| 6,833,955 | B2 | 12/2004 | Niv |
| 6,855,037 | B2 | 2/2005 | Ashjaee et al. |
| 6,869,876 | B2 | 3/2005 | Norman et al. |
| 6,879,443 | B2 | 4/2005 | Spitzer et al. |
| 6,882,479 | B2 | 4/2005 | Song et al. |
| 7,206,107 | B2 | 4/2007 | Levola |
| 2002/0041734 | A1 | 4/2002 | Worchesky et al. |
| 2002/0122015 | A1 | 9/2002 | Song et al. |
| 2002/0158131 | A1 | 10/2002 | Dickson et al. |
| 2003/0030596 | A1 | 2/2003 | Park |
| 2003/0040509 | A1 | 2/2003 | Moskowitz |
| 2003/0067685 | A1 | 4/2003 | Niv |
| 2003/0165017 | A1 | 9/2003 | Amitai |
| 2003/0202247 | A1 | 10/2003 | Niv et al. |
| 2004/0004767 | A1 | 1/2004 | Song |
| 2004/0051957 | A1 | 3/2004 | Liang |
| 2004/0062502 | A1 | 4/2004 | Levola |
| 2004/0174348 | A1 | 9/2004 | David |
| 2005/0201693 | A1 | 9/2005 | Korenaga et al. |
| 2006/0056028 | A1 * | 3/2006 | Wildnauer ................. 359/575 |
| 2006/0126179 | A1 | 6/2006 | Levola |

FOREIGN PATENT DOCUMENTS

| | | |
|---|---|---|
| EP | 1215522 | 6/2002 |
| EP | 1333308 | 8/2003 |
| EP | 1536268 | 1/2005 |
| EP | 1577872 | 9/2005 |
| GB | 2021803 | 5/1979 |
| JP | 04-097201 | 3/1992 |
| JP | 5-249383 | 9/1993 |
| JP | 06-230225 | 8/1994 |
| JP | 06-250022 | 9/1994 |
| JP | 2000-056259 | 2/2000 |
| WO | WO 95/11473 | 4/1995 |
| WO | WO99/52002 | 10/1999 |
| WO | WO 01/95027 | 12/2001 |
| WO | WO 03/032017 | 4/2003 |
| WO | WO 03/091763 | 11/2003 |
| WO | WO 2004/109349 | 12/2004 |
| WO | WO 2007/138576 | 12/2007 |
| WO | WO 2008/020450 | 2/2008 |

OTHER PUBLICATIONS

Eriksson et al. "Highly Directional Grating Outcouplers with Tailorable Radiation Characterisitics", IEEE Journal of Quantum Electronics, 32(6): 1038-1047, 1996. p. 1038, Col. 2, Par. 2, Fig. 3,6,7.

Weismann et al. "Apodized Surface-Corrugatd gratingss with Varying Duty Cycles", IEEE Photonics Technology Letters,12(6): 639-641, 2000. p. 640-641, fig. 1,2.

"NanoPrism Technology", Online web.archive.org/web/20050811031919/www.mirageinnovtions.com/main_technology.htm. Abstract.

Schulz et al. "Brillenanpassung", Optische Fachveroeffentlichung GmbH, p. 16, 1997.

Sung et al. "Analog Micro-Optics Fabrication by Use of a Binary Phase Grating Mask", Micromachining Technology for Micro-Optics and Nano-Optics II, Proceedings of the SPIE, 5347(1): 62-70, 2004.

Anonymous "Graphic CIE L*a*b* Calculator. Try the Color Metric Converter or the RGB Calculator", Applet, ColorEng Inc., Retrieved From the Internet: < URL:http://colorpro.com/info/tools/labcalc.htm>, 4 P., 2007.

Anonymous "TOPAS® : Thermoplastic Olefin Polymer of Amorphous Structure (COC). Cyclic Olefin Copolymer (COC)", Polyplastics, Retrieved From the Internet: URL:http://www.polyplastics.com/en/product/lines/topas/TOPAS.pdf, p. 1-7, 2008. Fig. 3.

Thirstrup et al. "Diffractive Optical Coupling Element for Surface Plasmon Resonance Sensors", Sensors and Actuators B, 100(3): 298-308, 2004. p. 300-302, Figs.2b, 2c.

* cited by examiner

MULTI-PLANE OPTICAL APPARATUS

This application claims the benefit of priority from U.S. Provisional Patent Application No. 60/667,773, filed Apr. 4, 2005.

FIELD AND BACKGROUND OF THE INVENTION

The present invention relates to the field of optics and, more particularly, to a method, apparatus and system for transmitting a chromatic light by decomposing the light into two or more sub-spectra thereby improving the transmission efficiency of the light.

Miniaturization of electronic devices has always been a continuing objective in the field of electronics. Electronic devices are often equipped with some form of a display, which is visible to a user. As these devices reduce in size, there is an increase need for manufacturing compact displays, which are compatible with small size electronic devices. Besides having small dimensions, such displays should not sacrifice image quality, and be available at low cost. By definition the above characteristics are conflicting and many attempts have been made to provide some balanced solution.

An electronic display may provide a real image, the size of which is determined by the physical size of the display device, or a virtual image, the size of which may extend the dimensions of the display device.

A real image is defined as an image, projected on or displayed by a viewing surface positioned at the location of the image, and observed by an unaided human eye (to the extent that the viewer does not require corrective glasses). Examples of real image displays include a cathode ray tube (CRT), a liquid crystal display (LCD), an organic light emitting diode array (OLED), or any screen-projected displays. A real image could be viewed normally from a distance of about at least 25 cm, the minimal distance at which the human eye can utilize focus onto an object. Unless a person is long-sighted, he may not be able to view a sharp image at a closer distance.

Typically, desktop computer systems and workplace computing equipment utilize CRT display screens to display images for a user. The CRT displays are heavy, bulky and not easily miniaturized. For a laptop, a notebook, or a palm computer, flat-panel display is typically used. The flat-panel display may use LCD technology implemented as passive matrix or active matrix panel. The passive matrix LCD panel consists of a grid of horizontal and vertical wires. Each intersection of the grid constitutes a single pixel, and controls an LCD element. The LCD element either allows light through or blocks the light. The active matrix panel uses a transistor to control each pixel, and is more expensive. On the other hand, active matrix panels typically provide higher extinction ratio (the difference between dark and lighted pixel) and larger number of gray levels, hence provide a higher quality display.

An OLED flat panel display is an array of light emitting diodes, made of organic polymeric materials. Existing OLED flat panel displays are based on both passive and active configurations. Unlike the LCD display, which controls light transmission or reflection, an OLED display emits light, the intensity of which is controlled by the electrical bias applied thereto. Flat-panels are also used for miniature image display systems because of their compactness and energy efficiency compared to the CRT displays. Small size real image displays have a relatively small surface area on which to present a real image, thus have limited capability for providing sufficient information to the user. In other words, because of the limited resolution of the human eye, the amount of details resolved from a small size real image might be insufficient.

By contrast to a real image, a virtual image is defined as an image, which is not projected onto or emitted from a viewing surface, and no light ray connects the image and an observer. A virtual image can only be seen through an optic element, for example a typical virtual image can be obtained from an object placed in front of a converging lens, between the lens and its focal plane, or at its focal plane. Light ray, which are emitted or reflected from an individual point on the object, diverge when passing through the lens, thus no two rays share two endpoints. An observer, viewing from the other side of the lens would perceive an image, which is located behind the object, hence enlarged. A virtual image of an object, positioned at the focal plane of a lens, is said to be projected to infinity. A virtual image display system, which includes a miniature display panel and a lens, can enable viewing of a small size, but high content display, from a distance much smaller than 25 cm. Such a display system can provide a viewing capability which is equivalent to a high content, large size real image display system, viewed from much larger distance.

Conventional virtual image displays are known to have many shortcomings. For example, such displays have suffered from being too heavy for comfortable use, as well as too large so as to be obtrusive, distracting and even disorienting. These defects stem from, inter alia, the incorporation of relatively large optics systems within the mounting structures, as well as physical designs which fail to adequately take into account important factors as size, shape, weight, etc.

Recently, holographic optical elements have been used in portable virtual image displays. Holographic optical elements serve as an imaging lens and a combiner where a two-dimensional, quasi-monochromatic display is imaged to infinity and reflected into the eye of an observer. A common problem to all types of holographic optical elements is their relatively high chromatic dispersion. This is a major drawback in applications where the light source is not purely monochromatic. Another drawback of some of these displays is the lack of coherence between the geometry of the image and the geometry of the holographic optical element, which causes aberrations in the image array that decrease the image quality.

New designs, which typically deal with a single holographic optical element, compensate for the geometric and chromatic aberrations by using non-spherical waves rather than simple spherical waves for recording; however, they do not overcome the chromatic dispersion problem. Moreover, with these designs, the overall optical systems are usually every complicated and difficult to manufacture. Furthermore, the field-of-view resulting from these designs is usually very small.

U.S. Pat. No. 4,711,512 to Upatnieks, the contents of which are hereby incorporated by reference, describes a diffractive planar optics head-up display configured to transmit collimated light wavefronts of an image, as well as to allow light rays coming through the aircraft windscreen to pass and be viewed by the pilot. The light wavefronts enter an elongated optical element located within the aircraft cockpit through a first diffractive element, are diffracted into total internal reflection within the optical element, and are diffracted out of the optical element by means of a second diffractive element into the direction of the pilot's eye while retaining the collimation. Upatnieks, however, does not teach how the display could transmit a wide field-of-view, or tackle a broad spectrum of wavelengths (for providing color images). In particular, Upatnieks teaches the use of thick volume holograms which are known to have narrow angular and chromatic response, albeit their high diffraction efficiency.

U.S. Pat. Nos. 5,966,223 and 5,682,255 to Friesem et al., the contents of which are hereby incorporated by reference describes a holographic optical device similar to that of Upatnieks, with the additional aspect that the first diffractive optical element acts further as the collimating element that collimates the waves emitted by each data point in a display source and corrects for field aberrations over the entire field-of-view. The field-of-view discussed is ±6°, and there is a further discussion of low chromatic sensitivity over wavelength shift of $\Delta\lambda_c$ of ±2 nm around a center wavelength $\lambda_c$ of 632.8 nm. However, the diffractive collimating element of Friesem et al. is known to narrow spectral response, and the low chromatic sensitivity at spectral range of ±2 nm becomes an unacceptable sensitivity at ±20 nm or ±70 nm.

U.S. Pat. No. 6,757,105 to Niv et al., the contents of which are hereby incorporated by reference, provides a diffractive optical element for optimizing a field-of-view for a multicolor spectrum. The optical element includes a light-transmissive substrate and a linear grating formed therein. Niv et al. teach how to select the pitch of the linear grating and the refraction index of the light-transmissive substrate so as to trap a light beam having a predetermined spectrum and characterized by a predetermined field of view to propagate within the light-transmissive substrate via total internal reflection. Niv et al. also disclose an optical device incorporating the aforementioned diffractive optical element for transmitting light in general and images in particular into the eye of the user.

U.S. patent application Ser. Nos. 10/896,865 and 11/017,920 to Niv et al. disclose a binocular device in which light diffracts through a diffraction element into a light transmissive substrate and propagates with the substrate in two directions. The light then diffracts, through a left diffraction element and a right diffraction element, out of the substrate into the eyes of the user. This device exploits the well-known physiological mechanism of the human visual system to infer a complete image based on several portions thereof. The left and right diffraction elements provide a different, asymmetric, field-of-view to each eye of the user, but the user perceives a binocular symmetric field-of-view which is wider than each of the two asymmetric field-of-views.

It is well known that the diffraction and transmission efficiency of light depends on the wavelength (color) of the light. Prior art virtual image devices are designed to have a maximal diffraction and transmission efficiency for a particular color, while compromising with lower diffraction and transmission efficiencies of other colors. The resulting images of such devices therefore suffer from low quality due to non-uniform color brightness.

There is thus a widely recognized need for, and it would be highly advantageous to have an apparatus, system and method for transmitting light devoid the above limitations.

SUMMARY OF THE INVENTION

According to one aspect of the present invention there is provided an optical apparatus for transmitting light generated by a chromatic light source, the light having a spectrum of wavelengths, the apparatus comprising a plurality of optical devices design and constructed to decompose the light into a plurality of portions respectively corresponding to different sub-spectra of the spectrum, such that each portion of the plurality of portions is efficiently transmitted within a different optical device.

According to further features in preferred embodiments of the invention described below, each optical device comprises a light-transmissive substrate formed with at least one input optical element designed and constructed to diffract a respective portion of the light into the light-transmissive substrate, so as to allow propagation of the light within the light-transmissive substrate via total internal reflection.

According to still further features in the described preferred embodiments input optical elements of different light-transmissive substrates have at least a partial overlap therebetween.

According to still further features in the described preferred embodiments each optical device is characterized by the same horizontal field-of-view which equals the overall horizontal field-of-view of the apparatus.

According to still further features in the described preferred embodiments the light-transmissive substrate is further formed with at least one output optical element. The output optical element(s) are designed and constructed to diffract a respective portion of the light out of the light-transmissive substrate, while allowing other portions of the light to pass through the output optical element(s) with minimal or no diffraction.

According to still further features in the described preferred embodiments output optical elements of different light-transmissive substrates have at least a partial overlap therebetween.

According to another aspect of the present invention there is provided a system for providing an image to a user, the image being constituted by light having a spectrum of wavelengths, the system comprising: an optical apparatus which comprises a plurality of optical devices design and constructed to decompose and recompose the light, in a manner such that different portions of the light, corresponding to different sub-spectra of the spectrum, efficiently propagate within different optical devices and exit the optical apparatus into at least a first eye of the user; and an image generating device for providing the optical apparatus with the image.

According to further features in preferred embodiments of the invention described below, each optical device is a planar optical device engaging a different plane.

According to still further features in the described preferred embodiments the plurality of optical devices comprises a first optical device and a second optical device. According to still further features in the described preferred embodiments the sub-spectra comprise a first sub-spectrum and a second sub-spectrum. According to still further features in the described preferred embodiments the plurality of optical devices comprises a first optical device, a second optical device and a third optical device.

According to still further features in the described preferred embodiments the sub-spectra comprise a first sub-spectrum, a second sub-spectrum and third sub-spectrum.

According to yet another aspect of the present invention there is provided a method of transmitting light having a spectrum of wavelengths, the method comprising decomposing the light into a plurality of portions respectively corresponding to different sub-spectra of the spectrum, and efficiently transmitting each of the light within a different optical device.

According to further features in preferred embodiments of the invention described below, the decomposing comprises diffracting each portion of the light in a substantially exclusive manner.

According to still further features in the described preferred embodiments the method further comprising recomposing the plurality of portions. According to still further features in the described preferred embodiments the recomposing comprises diffracting each portion of the light out of a respective light light-transmissive substrate.

According to still further features in the described preferred embodiments the decomposing, transmitting and recomposing is done in a manner such that a horizontal field-of-view characterizing the light is preserved.

According to still further features in the described preferred embodiments the minimal diffraction is characterized by a diffraction efficiency of less than 10 percents.

According to still further features in the described preferred embodiments each of the at least one input optical element and the at least one output optical element of each optical device is designed and constructed such that light rays are diffracted into the optical device by the at least one input optical element, and diffracted out of the optical device by the at least one output optical element in an angle-preserving manner.

According to still further features in the described preferred embodiments each output optical element of each optical device is designed and constructed to reduce brightness non-uniformities of a predetermined portion of the light diffracted thereby.

According to still further features in the described preferred embodiments the output optical element comprises a plurality of sections, each section of the plurality of sections being characterized by different diffraction efficiency. According to still further features in the described preferred embodiments the diffraction efficiencies of the plurality of sections form a harmonic series. According to still further features in the described preferred embodiments a number of the sections equal a characteristic number of reflections of a light ray of a respective sub-spectrum while propagating along the output optical element.

According to still further features in the described preferred embodiments the at least one output optical element comprises a first output optical element and a second output optical element.

According to still further features in the described preferred embodiments the at least one input optical element, the first output optical element and the second output optical element are designed and constructed such that each light ray of the respective portion of the light bifurcates within the optical device and exits the light-transmissive substrate in a form of two substantially parallel light rays.

According to still further features in the described preferred embodiments the each of the at least one input optical element is independently a linear diffraction grating.

According to still further features in the described preferred embodiments the each of the at least one output optical element is independently a linear diffraction grating.

According to still further features in the described preferred embodiments the linear diffraction grating of the at least one input optical element and the linear diffraction grating of the at least one output optical element have substantially identical periods.

According to still further features in the described preferred embodiments the linear diffraction grating of the at least one input optical element and the linear diffraction grating of the at least one output optical element are substantially parallel.

According to still further features in the described preferred embodiments a ratio between a wavelength of the respective portion of the light and a period characterizing the linear diffraction gratings is larger than or equal a unity.

According to still further features in the described preferred embodiments a ratio between a wavelength of the respective portion of the light and a period characterizing the linear diffraction gratings is smaller than a refraction index of the light-transmissive substrate.

According to still further features in the described preferred embodiments the apparatus or system further comprises a collimator for collimating the light. According to still further features in the described preferred embodiments the collimator comprises a converging lens. According to still further features in the described preferred embodiments the collimator comprises a diffractive optical element.

According to still further features in the described preferred embodiments a maximal diffraction angle characterizing the total internal reflection equals about 80 degrees with respect to a perpendicular orientation to the light-transmissive substrate.

According to still further features in the described preferred embodiments a maximal diffraction angle characterizing the total internal reflection is selected so as to allow at least one reflection over a predetermined distance in the light-transmissive substrate. According to still further features in the described preferred embodiments the predetermined distance is from about 25 mm to about 80 mm.

According to still further features in the described preferred embodiments a thickness of the light-transmissive substrate is from about 0.5 mm to about 5 mm. According to still further features in the described preferred embodiments the thickness of the light-transmissive substrate is larger than ten times a shortest wavelength of the spectrum.

According to still further features in the described preferred embodiments the light-transmissive substrate is selected from the group consisting of glass and a transparent polymer.

According to still further features in the described preferred embodiments the horizontal field-of-view is of at least 16 degrees, more preferably at least 20 degrees, even more preferably at least 24 degrees.

The present invention successfully addresses the shortcomings of the presently known configurations by providing an apparatus, system and method for an efficient transmission of chromatic light.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of a prior art chromatic image-displaying system;

FIG. 2 is a flowchart diagram of a method suitable for transmitting light having a spectrum of wavelengths, according to various exemplary embodiments of the invention;

Figure 3A:
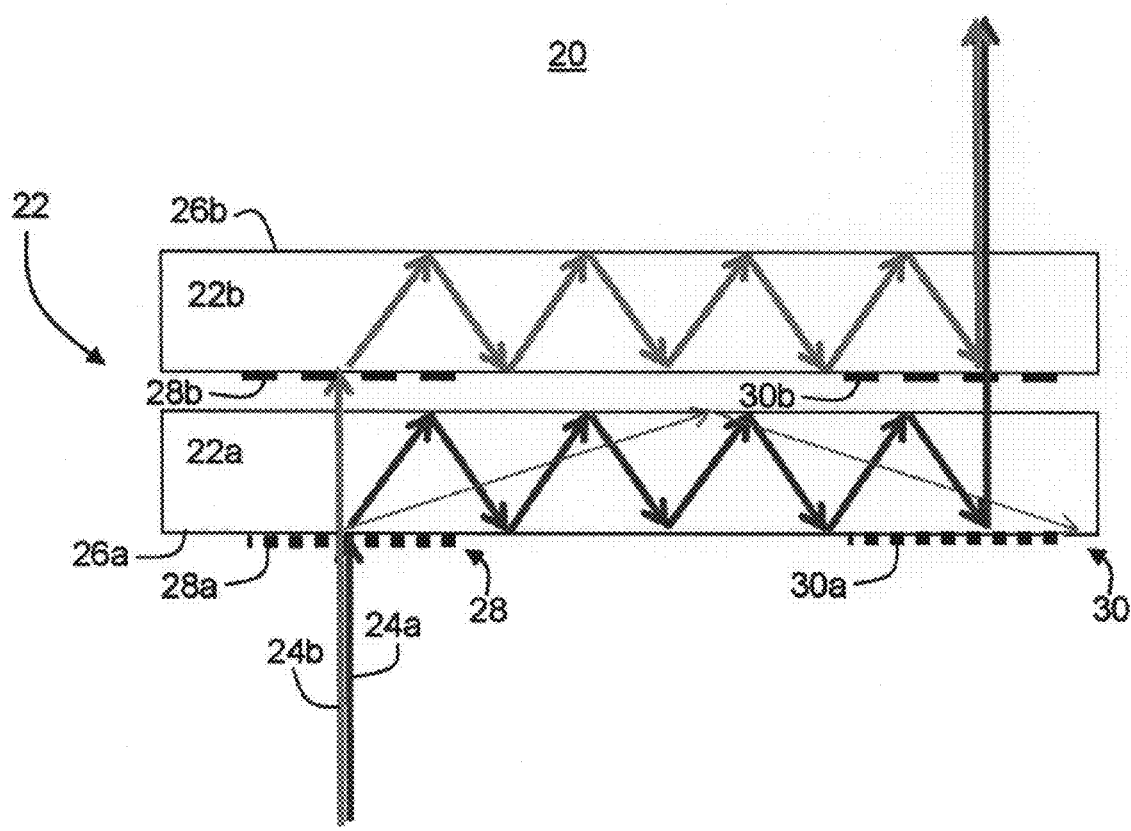
Figure 3B:
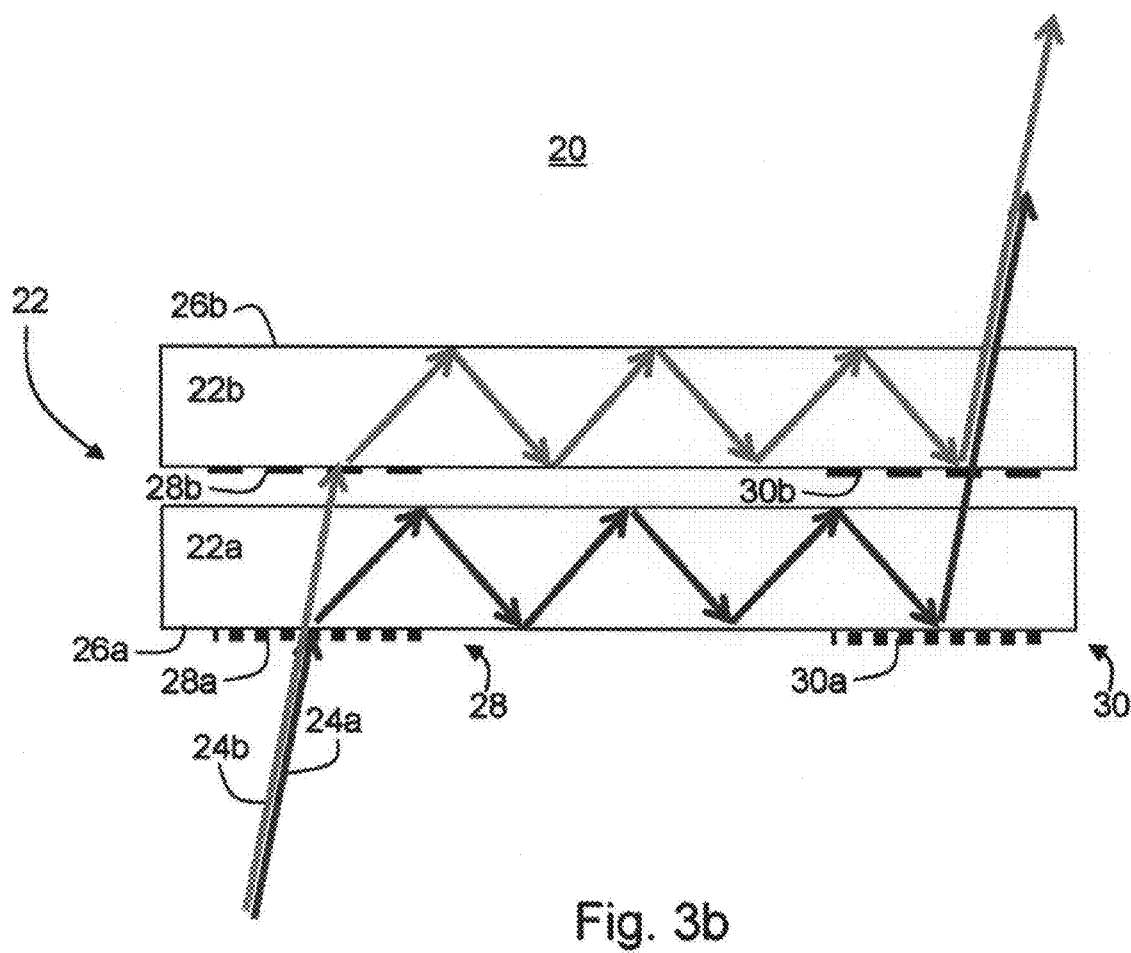
Figure 3C:
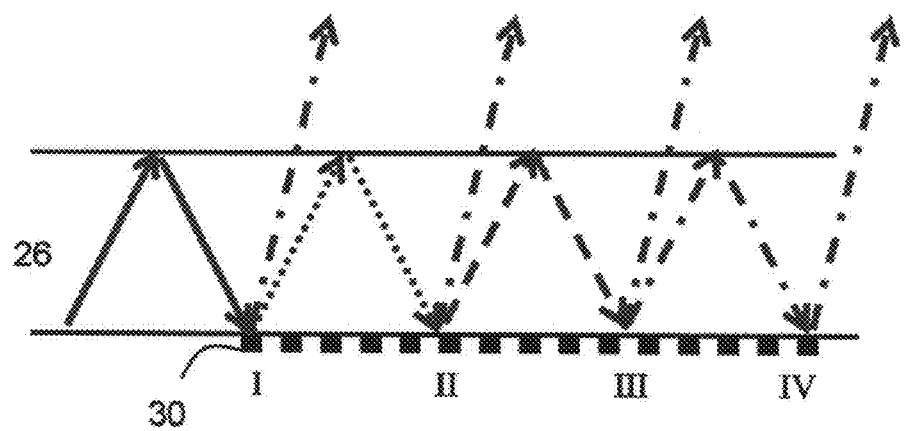
Figure 4:
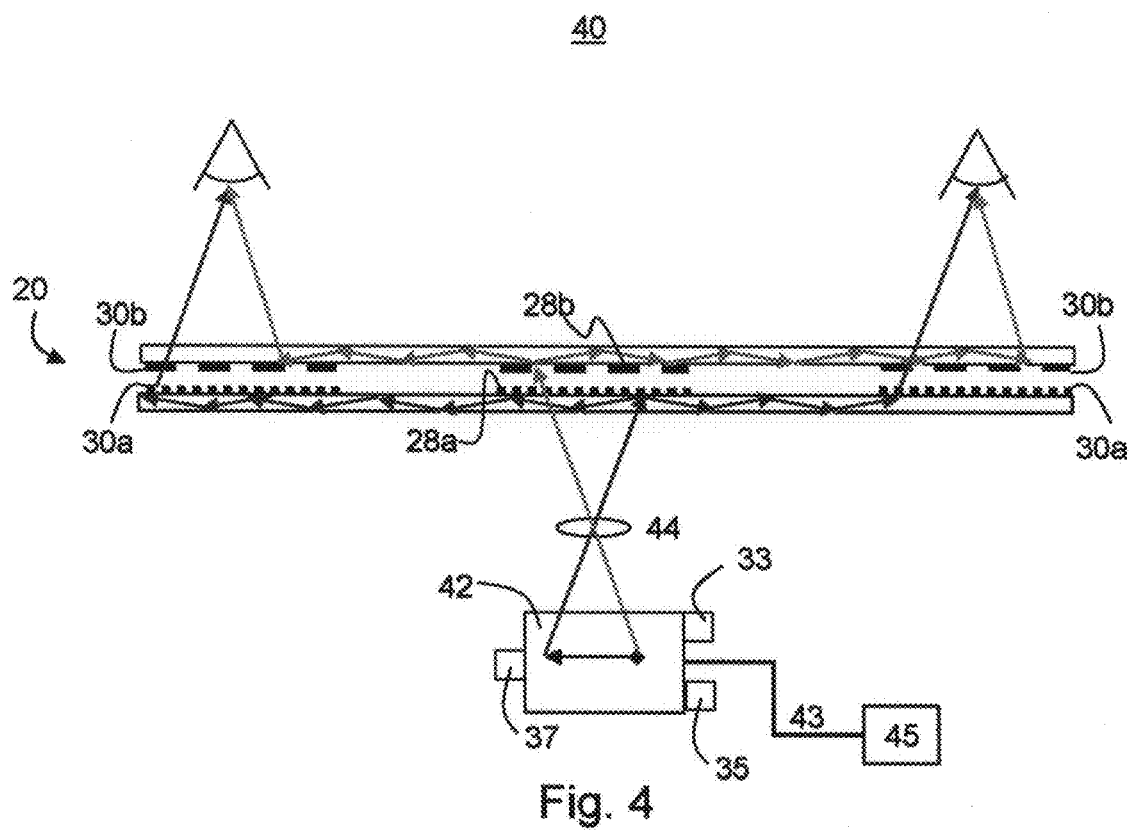

FIGS. 3a-b are schematic illustrations of an optical apparatus for transmitting light having a spectrum of wavelengths, according to various exemplary embodiments of the invention;

FIG. 3c is a schematic illustration of an output optical element, according to various exemplary embodiments of the invention; and FIG. 4 is a schematic illustration of a system for providing an image to a user, according to various exemplary embodiments of the invention.

DESCRIPTION OF THE PREFERRED EMBODIMENTS

The present invention is of an apparatus system, and method which can be used for transmitting chromatic light. Specifically, the present invention can be used to efficiently transmit chromatic virtual images into the eyes of the user.

Before explaining at least one embodiment of the invention in detail, it is to be understood that the invention is not limited in its application to the details of construction and the arrangement of components set forth in the following description or illustrated in the drawings. The invention is capable of other embodiments or of being practiced or carried out in various ways. Also, it is be understood that the phraseology and terminology employed herein is for the purpose of description and should not be regarded as limiting.

When a ray of light moving within a light-transmissive substrate and striking one of its internal surfaces at an angle $\alpha_1$ as measured from a normal to the surface, it can be either reflected from the surface or refracted out of the surface into the open air in contact with the substrate. The condition according to which the light is reflected or refracted is determined by Snell's law, which is mathematically realized through the following equation:

$$n_A \sin \alpha_2 = n_S \sin \alpha_1,\qquad\text{(EQ. 1)}$$

where $n_S$ is the index of refraction of the light-transmissive substrate, $n_A$ is the index of refraction of the medium outside the light transmissive substrate ($n_S > n_A$), and $\alpha_2$ is the angle in which the ray is refracted out, in case of refraction. Similarly to $\alpha_1$, $\alpha_2$ is measured from a normal to the surface. A typical medium outside the light transmissive substrate is air having an index of refraction of about unity.

As a general rule, the index of refraction of any substrate depends on the specific wavelength $\lambda$ of the light which strikes its surface. Given the impact angle, $\alpha_1$, and the refraction indices, $n_S$ and $n_A$, Equation 1 has a solution for $\alpha_2$ only for $\alpha_1$ which is smaller than arcsine of $n_A/n_S$ often called the critical angle and denoted $\alpha_c$. Hence, for sufficiently large $\alpha_1$ (above the critical angle), no refraction angle $\alpha_2$ satisfies Equation 1 and light energy is trapped within the light-transmissive substrate. In other words, the light is reflected from the internal surface as if it had struck a mirror. Under these conditions, total internal reflection is said to take place. Since different wavelengths of light (i.e., light of different colors) correspond to different indices of refraction, the condition for total internal reflection, depends not only on the angle at which the light strikes the substrate, but also on the wavelength of the light. In other words, an angle which satisfies the total internal reflection condition for one wavelength may not satisfy this condition for a different wavelength.

In planar optics there is a variety of optical elements which are designed to couple light into a light transmissive substrate, and provide an appropriate condition of total internal reflection so that a light is transmitted within the light transmissive substrate over a predetermined optical distance. Typically, such optical elements are manufactured as linear gratings which are located on one surface of light-transmissive substrate at or opposite to the entry point of the light rays. A linear grating is characterized by a so-called grating period or grating pitch, d, which is directly related to the wavelength, $\lambda$, of the light and to the angles $\alpha_I$ and $\alpha_D$, at which a ray of the light incident the light-transmissive substrate and diffracted inwards, respectively. The relation is given by the following equation:

$$n_S \sin \alpha_D - n_A \sin \alpha_I = \pm \lambda/d.\qquad\text{(EQ. 2)}$$

According the known conventions, the sign of $\alpha_I$ and $\alpha_D$ is positive, if the angles are measured clockwise from the normal to the surface, and negative otherwise. The dual sign on the RHS of Equation 2 relates to two possible orders of diffraction, +1 and −1, corresponding to diffractions in opposite direction, say, "diffraction to the right" and "diffraction to the left," respectively.

Any optical element designated for manipulating light can be characterized by the range of allowed incident angles at which the optical element can operate. This quantity is known in the literature as "horizontal field-of-view". For optical elements which couple the light into a light transmissive substrate and provide the condition for total internal reflection (e.g., linear gratings) the horizontal field-of-view is defined as the range of incident angles for which the condition for total internal reflection can be fulfilled. "Horizontal field-of-view" is abbreviated herein to "field-of-view".

The field-of-view can be expressed either inclusively, in which case its value corresponds to the difference between the minimal and maximal incident angles, or explicitly in which case the field-of-view has a form of a mathematical range or set. Thus, for example, a field-of-view, $\phi$, spanning from a minimal incident angle, $\alpha$, to a maximal incident angle, $\beta$, is expressed inclusively as $\phi = \beta - \alpha$, and exclusively as $\phi = [\alpha, \beta]$. The minimal and maximal incident angles are also referred to as leftmost and rightmost incident angles or clockwise and anticlockwise field-of-view angles, in any combination.

U.S. Pat. No. 6,757,105 to Niv et al., the contents of which are hereby incorporated by reference, describes a method for calculating the field-of-view of a linear diffraction grating. Briefly, for a linear diffraction grating of period d, the maximal field-of-view that can be diffracted to the right, for example, $\phi = [\alpha_I^{FOV-}, \alpha_I^{FOV+}]$ can be calculated as follows:

First, the critical angle $\alpha_c$ is substituted for the diffraction angle $\alpha_D$ in Equation 2:

$$n_S \sin \alpha_c - n_A \sin \alpha_I^{FOV-} = \lambda/d.\qquad\text{(EQ. 3).}$$

Substituting the condition for total internal reflection (sin $\alpha_c = n_A/n_S$) one obtains:

$$n_A(1 - \sin \alpha_I^{FOV-}) = \lambda/d.\qquad\text{(EQ. 4)}$$

Second, the maximal value allowed for $\alpha_D$ is defined, say $\alpha_D^{Max} = 80°$, and Equation 4 is solved for angle, $\alpha_I^{FOV+}$:

$$n_S \sin \alpha_D^{Max} - n_A \sin \alpha_I^{FOV+} = \lambda/d.$$

Similar calculations can be performed by one ordinarily skilled in the art for diffraction to the left.

As stated in the Background section above, the diffraction efficiency of light depends on the wavelength of the light. As will be appreciated by one of ordinary skill in the art, when the diffraction effect is used for transmitting light from one location to the other (for example by providing the appropriate condition for total internal reflection to take place), the wavelength dependence of the diffraction efficiency also affects the transmission efficiency of the light. Thus, when a light having a spectrum of wavelength is diffracted through a diffraction grating, some wavelengths of the light are diffracted with lower efficiency than the others.

The present invention successfully provides a method, apparatus and system for transmitting light in a decomposed manner.

Figure 1:
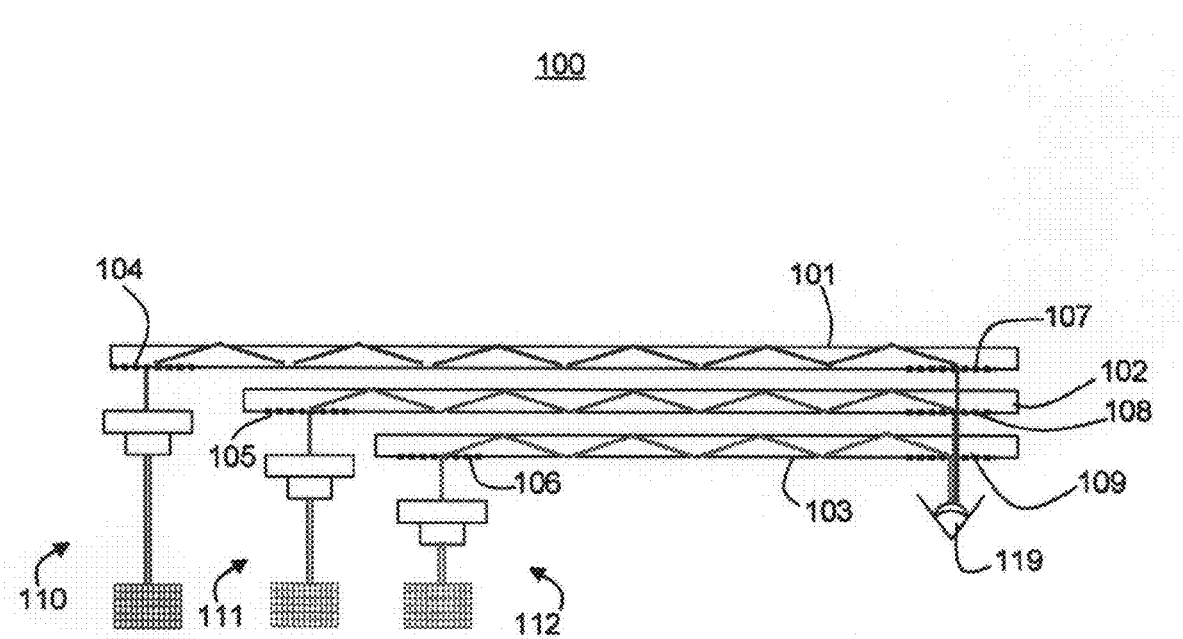
Figure 2:
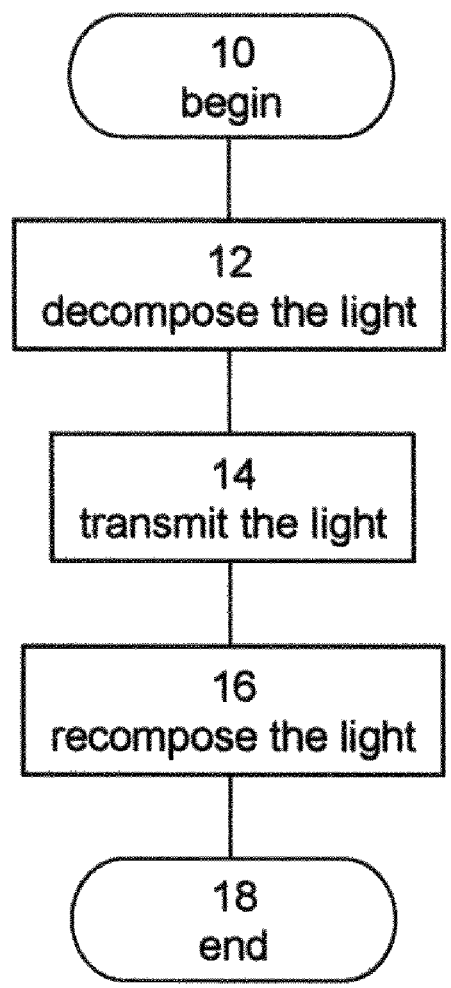

For purposes of better understanding the present invention, as illustrated in FIGS. 2-4 of the drawings, reference is first made to the construction and operation of a conventional (i.e., prior art) optical system as illustrated in FIG. 1.

FIG. 1 is a cross section view of a chromatic image-displaying system 100 described in U.S. patent application Ser. No. 10/367,894, the contents of which are hereby incorporated by reference. System 100 includes three transparent plates 101, 102 and 103 each formed with an input diffractive optical element (designated in FIG. 1 by numerals 104, 105 and 106, respectively), and an output diffractive optical element (designated in FIG. 1 by numerals 107, 108 and 109, respectively). The input diffractive optical elements are spaced apart, such that there is no overlap therebetween with respect to a direction perpendicular to the transparent plates. System 100 further includes three monochromatic image sources, 110, 111 and 112 for feeding input diffractive optical elements 104, 105 and 106, respectively.

Hence, system 100 is assembled from three monochromatic image-displaying systems each having an input diffractive optical element, a transparent plate, an output diffractive optical element and a monochromatic image source. Red light, constituting a red image generated by image source 112 enters plate 103 through element 106, propagates through plate 103 by total internal reflection, and exits through element 109. Green light, constituting a green image generated by image source 111 enters plate 102 through element 105, propagates through plate 102 and exits through element 108. Upon exit, the green light rays impinge on plate 103, penetrate it without diffraction and exit through element 105. In a similar manner, blue light, constituting a blue image generated by image source 110, enters plate 101 through element 104, propagates through plate 101 and exits through element 107. The blue light rays penetrate through plates 102 and 103 via their output elements. The individual red, green and blue images, which are generated separately, are thus assembled on the exit and being viewed by an eye 119 as a chromatic image.

System 100 is therefore useful for providing the user with a chromatic image generated by three spaced apart monochromatic image sources. In system 100, spatially separated monochromatic light beams are transmitted into the individual input element, and there is no overlap between the incident light beams, nor is there an overlap between elements 104, 105 and 106. A single chromatic image source, which radiates a wide spectrum of wavelengths in a single light beam, is therefore not favored by system 100.

While conceiving the present invention it was realized by the Inventors, that a chromatic light (such as, for example, a light radiated by a single chromatic image source) can be efficiently transmitted by first decomposing the light into individual sub-spectra and transmitting each sub-spectra using a different optical device.

Reference is now made to FIG. 2 which is a flowchart diagram of a method suitable for transmitting light having a spectrum of wavelengths (i.e., chromatic light), according to various exemplary embodiments of the present invention. The method begins in step 10 and continues to step 12 in which the light is decomposed into a plurality of portions, where each portion of the light corresponds to a different sub-spectrum. The decomposition of the light can thus be considered as a spectral decomposition in a sense that a chromatic light ray coming from a particular direction is decomposed into two or more light rays each belonging to a different sub-spectrum.

Thus, unlike prior art system 100 in which the light has to be generated by a plurality of monochromatic image sources in order to allow efficient transmission of the image, the present embodiments can transmit a chromatic light beam generated by a single chromatic source because the present embodiments successfully decompose the chromatic light beam into a plurality of sub-spectra.

It is to be understood, that the number of sub-spectra does not have to equal the number of individual wavelengths existing in the light ray, although such embodiment is not excluded from the scope of the present invention.

In various exemplary embodiments of the invention a relatively small (e.g., 2, 3, 4) number of sub-spectra is employed. In the preferred embodiment in which two sub-spectra are used, one sub-spectrum can include red and near-red wavelengths and one sub-spectrum can include blue and near-blue wavelengths. In the preferred embodiment in which three sub-spectra are used, an additional sub-spectrum can include green and near-green wavelengths. In various exemplary embodiments of the invention there is a certain overlap between the sub-spectra. For example, in the above embodiment of two sub-spectra, the first sub-spectrum can include wavelengths of from about 540 to about 650 nm, corresponding to the red part of the spectrum, and the second sub-spectrum can include wavelengths of from about 460 to about 570 nm, corresponding to the blue part of the spectrum. Thus, in this exemplary embodiment, the two sub-spectra have an overlap of about 30 nm.

As used herein the term "about" refers to ±10%.

The method continues to step 14 in which each portion of the light is transmitted within a different optical device. In various exemplary embodiments of the invention the optical devices used for transmitting the portions of the light are planar optical devices which engage different, preferably parallel, planes. Thus, the method of the present embodiments successfully transmits different sub-spectra through different planes. The advantage of transmitting the decomposed light is that the transmission efficiency of each portion of the light can be tailored to its spectral range, thus optimizing the overall transmission efficiency.

According to a preferred embodiment of the present invention the method continues to step 16 in which the sub-spectra are recomposed so as to reconstruct the spectrum of original light beam. As further detailed hereinafter, the light can be generated by an image generating device, in which case the light carries imagery information. In these embodiments, step 12 of the method decomposes the images into a plurality of partial images each having a different spectral ranges, and step 16 reconstructs the original image by recomposing the spectral ranges of the previously formed partial images.

The method ends in step 18.

The above method steps can be implemented using an optical apparatus 20 which is schematically illustrated in FIGS. 3a-b Apparatus 20 preferably comprises a plurality of optical devices 22. The optical devices decompose the light into a plurality of portions where each portion corresponds to a different sub-spectrum. Each optical device transmits one portion of the light, preferably in different planes. Shown in FIGS. 3a-b are two such optical devices, designated 22a and 22b. Light, represented in FIGS. 3a-b by two light rays, 24a and 24b, is transmitted in a decomposed manner through apparatus 20: ray 24a is transmitted through device 22a and ray 24b is transmitted through device 22b.

The decomposing is preferably achieved on the entry of the light into each individual optical device. More specifically, the first optical device (e.g., device 22a) entraps a first portion of the light (e.g., ray 24a) therein and allows other portions (e.g., ray 24b) to continue to the next optical device (e.g., device 22b) and so on. According to a preferred embodiment of the present invention each optical device comprises a light-transmissive substrate 26 formed with one or more input optical elements 28. The input optical elements diffract the respective portion of the light into the light-transmissive substrate, in a substantially exclusive manner.

The term "diffraction" as used herein, refers to a change, $\Delta\theta$, in the propagation direction of a wavefront, in either a transmission mode or a reflection mode. In a transmission mode, "diffraction" refers to change in the propagation direction of a wavefront while passing through an optical element; in a reflection mode, "diffracting" refers to change in the propagation direction of a wavefront while reflecting off an optical element. Preferably, "diffraction" refers to a change in the propagation direction which is different from the conventional definition of reflection, where the angle of reflection equals the angle of incidence. In angular terminology, $\Delta\theta$ is smaller than 90° in transmission mode and larger than 90° in reflection mode.

As used herein, "diffraction in a substantially exclusive manner" refers to a situation in which a portion X of the light is diffracted, and all other portions of the light are not diffracted or partially diffracted with suppressed diffraction efficiencies relative to the diffraction efficiency of portion X.

The exclusive diffraction can be better understood from the following numerical example, which is not intended to be limiting. Suppose that a particular optical device is designated for transmitting blue or near blue light, say, light at wavelength of 400-500 nm. For a wavelength $\lambda$ of un-polarized light within this range ($400 \leq \lambda \leq 500$), the input optical element(s) of the optical device diffract the light into the light-transmissive substrate, at a diffraction efficiency of 15%-30%. On the other hand, for $\lambda \notin [400, 500]$ (e.g., the red and near-red portions of the light) the input optical element(s) either do not diffract the light at all or partially diffract it at a very low diffraction efficiency, e.g., below 10%, more preferably below 7%, even more preferably below 5%.

An illustration of the above example is shown in FIG. 3a. Both light rays 24a and 24b impinge on input optical element 28a of device 22a. Element 28a efficiently diffracts ray 24a (blue line) which thus propagates within substrate 26a via total internal reflection. The propagation of ray 24a is illustrated as a broken blue line representing reflection of ray 24a off the surfaces of substrate 26a. Ray 24b (red line) also enters substrate 26a, but experiences only partial diffraction with low efficiency. The partial diffraction of ray 24b is shown as a broken thin red line representing wide-angle reflection off the surfaces of substrate 26a. Most of the optical energy carried by ray 24b is not trapped within substrate 26a, but continues in the direction of substrate 26b of device 22b and impinge on input optical element 28b, which, in the illustrative example of FIG. 3a is formed on the entry side of substrate 26b. Upon impinging on element 28b, ray 24b efficiently diffracts into substrate 26b and propagates therein via total internal diffraction. This propagation is illustrated as a broken red line representing reflection of ray 24b off the surfaces of substrate 26b. The input elements are preferably designed such that the diffraction angle of ray 24b within substrate 26b is significantly smaller than the diffraction angle of ray 24b within substrate 26a. According to a preferred embodiment of the present invention the input elements are designed such that the diffraction angle of ray 24b within substrate 26b is about the same as the diffraction angle of ray 24a within substrate 26a.

In various exemplary embodiments of the invention the input optical elements are located such that a sufficient spatial overlap is formed therebetween. In other words, when viewed from a direction perpendicular to the light-transmissive substrates, the input optical elements at least partially superimpose. The overlap between the input optical elements is preferably of at least 50%, more preferably at least 75%, even more preferably at least 95% (e.g., 100%). The overlap between the input optical elements allows rays which are not efficiently diffracted by one optical element to continue to the next optical element, with minimal or no diffraction. In the exemplified embodiment of FIG. 3a, the overlap between element 28a and 28b allows ray 24b which is not efficiently diffracted by element 28a to impinge on element 28b.

Upon impinging on element 28b, ray 24b efficiently diffracts into substrate 26b and propagates therein via total internal diffraction. This propagation is illustrated as a broken red line representing reflection of ray 24b off the surfaces of substrate 26b.

The incoming light rays in FIG. 3a are drawn perpendicular to the surfaces of the optical devices (zero incident angle, according to the aforementioned convention). When elements 28a and 28b are linear diffraction gratings, the relation between diffraction angles of the two rays can be calculated from Equation 2 above, by substituting $\alpha_I = 0$:

$$\sin \alpha_{D,24b} / \sin \alpha_{D,24a} = \lambda_{24b} / \lambda_{24a}. \quad \text{(EQ. 5)}$$

where $\alpha_{D,24a}$, $\lambda_{24a}$, $\alpha_{D,24b}$ and $\lambda_{24b}$ are the diffraction angles and wavelengths of rays 24a and 24b, respectively. As a numerical example, if the index of refraction of substrate 26a is 1.66, the wavelength of ray 24a is 470 nm, the wavelength of ray 24b is 620 nm, and the grating period of element 28a is 389 nm, then, upon normal incidence of the rays on element 28a, ray 24a is diffracted at an angle of 46.7° and ray 24b is diffracted at an angle of 73.8°.

The grating period of element 28a and the refraction index can also be selected such that ray 24b is not diffracted at all. For example, if the index of refraction of the substrate is $n_S = 1.5$ normal incidence of the rays results in no diffraction of ray 24b by element 28a.

Inclined light rays diffract at different angles and may not diffract at all. Such situation is shown in FIG. 3b. Rays 24a and 24b are now inclined (nonzero incident angle) to the surface of substrate 26a, and ray 24a is exclusively diffracted by element 28a. The entire optical energy of ray 24b enters substrate 26b, is diffracted by element 28b (which is specifically designed for the spectral range of ray 24b) and propagates within substrate 26b.

As will be appreciated by one ordinarily skilled in the art, when the incident angle is not within the field-of-view of the optical devices, both rays are not entrapped in the light transmissive substrates.

Apparatus 20 is preferably characterized by a wide horizontal field-of-view. According to a preferred embodiment of the present invention the horizontal field-of-view of apparatus 20 is preferably, in inclusive representation, at least 16° (e.g., incident angles of ±8°), more preferably at least 20°

(e.g., incident angles of ±10°), even more preferably at least 24° (e.g., incident angles of ±12°). According to a preferred embodiment of the present invention each and all optical devices is characterized by the same field-of-view of apparatus 20. The advantage of this embodiment is that all colors are transmitted across the entire field-of-view.

Generally, a common field-of-view for all the optical devices can be achieved by selecting a set of calibrating parameters and constructing the optical devices such that for a particular choice of the calibrating parameters, all optical devices respectively diffract the portions of light through substantially identical diffraction angles. The calibrating parameters are preferably an incident angle for which the optical devices are calibrated, representative wavelengths for each of the sub-spectra, refraction indices of the light transmissive substrate and the like. For the configuration shown in FIGS. 3a-b the representative wavelengths of the sub-spectra are a first representative wavelength $\lambda_1$ for device 22a and a second representative wavelength $\lambda_2$ for device 22b. For example, when device 22a is designated for transmitting blue and near-blue and device 22b designated for transmitting red and near-red wavelengths, $\lambda_1$ can be a typical wavelength of a blue light (say, 470 nm) and $\lambda_2$ can be a typical wavelength of a red light (say, 620 nm).

A common field-of-view for both devices can then be achieved by demanding that the diffraction angle of a light ray of wavelength $\lambda_1$ impinging at a predetermined incident angle $\alpha_I$ on device 22a, equals the diffraction angle of a light ray of wavelength $\lambda_2$ impinging the same incident angle $\alpha_I$ on device 22b. Conveniently, but not obligatorily, the refraction indices of substrate 26a and 26b can be the same, and the calibrating incident angle $\alpha_I$ can be set to zero, as shown in FIG. 3a. With such choice of the calibrating parameters, the aforementioned equal diffraction angles can be achieved by constructing element 28a as a linear diffraction grating with period $d_1$, and element 28b as a linear diffraction grating with period $d_2$, where $d_1$ and $d_2$ satisfy $d_1/d_2 = \lambda_1/\lambda_2$. This continent choice can be generalized to more than two optical devices. For example, when three optical devices are employed, the grating periods of the input elements can be set to satisfy $d_1:d_2:d_3 = \lambda_1:\lambda_2:\lambda_3$.

As a numerical example, suppose the sub-spectra transmitted by devices 22a and 22b can be represented by $\lambda_1 = 470$ nm and $\lambda_2 = 620$ nm. Suppose further that that it is desired to achieve a field-of-view of ±12° for both device 22a and 22b. Such field-of-views can be achieved using equal refraction indices for both light transmissive substrates, and grating periods of $d_1 = 389$ nm for element 28a and $d_2 = 513$ nm for element 28b. Under such conditions light rays within the entire field-of-view undergo diffraction by the respective input optical element with a relatively large diffraction efficiency. In various exemplary embodiments of the invention the two substrates have equal or similar refraction indices, selected such that $n_S \geq (\lambda/d + n_A \sin \alpha_I^{FOV+})/\sin \alpha_D^{Max}$. As higher refraction index for the substrate results in lower span of diffraction angles within the entire field-of-view, the preferred configuration is to use relatively high refraction indices so as to minimize or reduce the span of the diffraction angles. This embodiment is particularly useful when the devices also comprise output optical elements and it is desired to obtain a substantially uniform brightness of outgoing light, as further detailed hereinafter.

In various exemplary embodiments of the invention, each light-transmissive substrate is further formed with one or more output optical elements 30. Shown in FIGS. 3a-b are two output optical elements (one for each substrate): element 30a formed in substrate 26a and element 30b formed in substrate 26b. Elements 30 serve for recomposing the individual portions of the light by coupling the light rays out of apparatus 20. Similarly to the input optical elements, each output optical element diffracts the respective portion of the light out of the respective light-transmissive substrate, and allows the other portions of the light to pass with minimal or no diffraction. For example, 24a is diffracted by element 30a out of substrate 26a, and passes, with minimal or no diffraction through element 30b. Element 30b exclusively diffracts ray 24b out of substrate 26b, and the two rays are recomposed to the original light ray.

FIGS. 3a-b show an exemplified situation in which ray 24a is not diffracted by element 30b. Whether or not any particular light ray successfully impinges on one of the output optical elements to be diffracted out of the optical device, depends on the wavelength of the light, the initial angle of incidence upon the input optical element, the size of the input and output optical elements and the distance therebetween, and the characteristics of the optical device. In any event, each optical device is designed to diffract light of a predetermined wavelength and a predetermined angle of incidence at a prescribed diffraction angle and at an optimal efficiency. As a numerical example, when device 22b is designed to provide a horizontal field-of-view of [−12°, +12°] by diffracting red light having wavelength of 513 nm with maximal efficiency, blue light having wavelength of 470 nm is not diffracted by same device into total internal diffraction at angles of incidence below 4.8°, and is diffracted with relatively low efficiency for incidence angles between 4.8° and 12°.

The light rays are preferably diffracted out of the optical devices in an angle-preserving manner. More specifically, whether or not a particular light ray exits one of the transmissive substrates via diffraction, the exit angle of the ray substantially equals the angle at which the ray had struck the substrate. Referring to FIGS. 3a-b rays 24a and 24b, while experiencing a number of reflections within substrates 26a and 26b respectively, the exit angle of the rays substantially equals their striking angle and the propagation direction of the light in the external medium is preserved.

According to a preferred embodiment of the present invention the output optical elements are designed and constructed to reduce brightness non-uniformities of the portion of light which they diffract. This can be achieved using output optical elements which comprise a plurality of sections, each characterized by different diffraction efficiency, as further explained below with reference to FIG. 3c.

FIG. 3c is a simplified illustration of a reflective output optical element 30, according to a preferred embodiment of the present invention. A light ray propagates within substrate 26 until it reaches element 30 which diffracts the light out of substrate 26. A portion of the optical energy carried by the light ray is diffracted by element 30 and exits substrate 26. The remnant of the ray is redirected through an angle, which causes it to experience total internal reflection from the other side of substrate 26. After the first reflection, the ray strikes element 30 again, where it is partially diffracted out of substrate 26 and partially redirected for the second time. This process of partial diffraction and total internal reflection from the other side of substrate 26 continues along element 30.

In the exemplified embodiment of FIG. 3c the ray experiences four reflections along element 30. To improve the brightness uniformity of the exiting rays, each diffraction preferably occurs at different diffraction efficiency. Thus, according to a preferred embodiment of the present invention, the number of sections of the output optical element equals the number of reflections along the output optical element (four in the present example). The sections of element 30 are designated by roman numerals I, II, III and IV.

In various exemplary embodiments of the invention the diffraction efficiencies of the output optical element form a harmonic series (1/k, k=1, 2, ... ). In the example of FIG. 3c the diffraction efficiencies of sections I, II, III and IV, are, respectively, about 25%, 33%, 50% and 100% of the maximal diffraction efficiency of element 30. For illustrative purposes, reflected light rays of different optical energy are shown in FIG. 3c using different types of lines: solid lines, for light rays carrying 100% of the original optical energy, dotted lines (75%), dashed lines (50%) and dot-dashed lines (25%). Each of the four diffractions thus results in an emission of 25% of the original optical energy of the light ray, and a uniform brightness of the light across element 30 is achieved.

On the other hand, for wavelengths other than the range of wavelengths for which the output optical element is designed, there is a different number of reflections within the width of the output optical element, resulting in a non-uniform brightness of these wavelengths across the output optical element. As will be appreciated by one of ordinary skill in the art, such configuration makes the recomposing of the light more efficient hence reduces color distortions in the outputted light beam.

The use of different substrates and different output optical elements for the different sub-spectra allows for color-unique designs, such that each color is uniformly diffracted out of apparatus 20 and into the viewer's eyes, independent of the other sub-spectra.

One may define a "hop length" which is the lateral distance traveled by a light ray within the substrate between two successive points of total internal reflection. The hop length h depends on the diffraction angle $\alpha_D$ and the substrate thickness t, through the following equation:

$$h = t \tan \alpha_D. \quad\quad (EQ. 6)$$

Equation 6 can be used when the different substrates do not have the same index of refraction, and the hop lengths of the central angle of the field-of-view differ from one substrate to the other. In such cases, the variations of hop lengths of the central angle of the field-of-view can be eliminated or reduced by an appropriate selection of the substrate thickness t.

Any number of input/output optical elements can be used. Additionally, the number of input optical elements and the number of output optical elements may be different, as two or more output optical elements may share the same input optical element by optically communicating therewith, and vice verse. In various exemplary embodiments of the invention the input and output optical elements are linear diffraction gratings, preferably of identical periods, preferably formed on the light-transmissive substrates in a parallel orientation.

The input/output optical elements can engage any side of the light-transmissive substrate, in any combination. One ordinarily skilled in the art would appreciate that this corresponds to any combination of transmissive and reflective optical elements. In the exemplified configurations of FIGS. 3a-c all input optical elements are transmissive and all output optical elements are reflective, but this, as stated, need not necessarily be the case.

For example, suppose that a particular optical device comprises one input optical element, formed on a first side of its light-transmissive substrate, and one output optical element formed on a second side of the light-transmissive substrate. Suppose further that the light impinges on the first side of the substrate and it is desired to diffract the light out of the second side, to the eye of the user or to an adjacent optical device. In this case, the input optical element and the output optical element are both transmissive, so as to ensure that entrance of the light through the input optical element, and the exit of the light through the output optical element. Alternatively, if the input optical element is formed on the second side of the substrate and the output optical elements is formed on the first side of the substrate, then both elements are reflective.

In various exemplary embodiments of the invention each optical device comprises two output optical elements. This embodiment is particularly useful when apparatus 20 is used as a binocular apparatus, in which case a first and second output optical elements (of each optical device) diffracts the light into the left- and right-eye of the user, respectively. Such configuration is further detailed hereinunder with reference to FIG. 4.

As stated, the light can carry imagery information. Ideally, a multicolor image is a spectrum as a function of wavelength, measured at a plurality of image elements. This ideal input, however, is rarely attainable in practical systems. Therefore, the present embodiment also addresses other forms of imagery information. A large percentage of the visible spectrum (color gamut) can be represented by mixing red, green, and blue colored light in various proportions, while different intensities provide different saturation levels. Sometimes, other colors are used in addition to red, green and blue, in order to increase the color gamut. In other cases, different combinations of colored light are used in order to represent certain partial spectral ranges within the human visible spectrum.

In a different form of color imagery, a wide-spectrum light source is used, with the imagery information provided by the use of color filters. The most common such system is using white light source with cyan, magenta and yellow filters, including a complimentary black filter. The use of these filters could provide representation of spectral range or color gamut similar to the one that uses red, green and blue light sources, while saturation levels are attained through the use of different optical absorptive thickness for these filters, providing the well known "grey levels".

Thus, the multicolored image can be displayed by three or more channels, such as, but not limited to, Red-Green-Blue (RGB) or Cyan-Magenta-Yellow-Black (CMYK) channels. RGB channels are typically used for active display systems (e.g., CRT or OLED) or light shutter systems (e.g., Digital Light Processing™ (DLP™) or LCD illuminated with RGB light sources such as LEDs). CMYK images are typically used for passive display systems (e.g., print). Other forms are also contemplated within the scope of the present invention.

The number as well as the type of the optical devices and their component is preferably selected according to the spectral channels used for generating the image. For example, a multicolor image can be provided by a OLED array having red, green and blue organic diodes which are viewed by the eye as continues spectrum of colors due to many different combinations of relative proportions and intensities between the wavelengths of light emitted thereby. For such images, three light transmissive substrates can be used, one for each spectral channel, where each substrate is formed with input/output optical elements designed for the respective spectral channel. It was found by the Inventors of the preset invention that RGB images can also be efficiently transmitted using only two light transmissive substrates.

This is because the green portion of the spectrum is partially diffracted by the optical device which is designated to the blue and near-blue light, and partially diffracted by the optical device which is designated to the red and near-red light. Generally, diffractions into and out of the two substrates are complimentary such that overall, high diffraction efficiency and brightness uniformity across the field-of-view is achieved.

Reference is now made to FIG. 4 which is a schematic illustration of a system 40 for providing an image to a user, according to various exemplary embodiments of the invention. System 40 preferably comprises an optical apparatus, e.g., apparatus 20, and an image generating device 42 for providing apparatus 20 with the image. Apparatus 20 transmit the light which carries the imagery information in a monocular or binocular manner.

In the embodiment in apparatus 20 is a monocular optical apparatus, optical devices 22 of apparatus 20 comprise a single output optical element (see FIGS. 3a-b). In the embodiments in which apparatus 20 is a binocular optical apparatus, each of optical devices 22 comprises two output optical elements, which diffract the light into a first eye 50 and a second eye 52 of the user. In this embodiment, each input optical element diffracts the light rays (of the respective sub-spectrum) such that the each light ray bifurcates, propagates within the respective substrate in two directions, and exits the substrate in a form of two substantially parallel light rays, as further detailed above.

In various exemplar embodiments of the invention system 40 comprises a collimator 44, preferably positioned between device 42 and apparatus 20. Collimator 44 serves for collimating the input light, if it is not already collimated, prior to impinging on apparatus 20. Any collimating element known in the art may be used as collimator 44, for example a converging lens (spherical or non spherical), an arrangement of lenses, a diffractive optical element and the like. The purpose of the collimating procedure is for improving the imaging ability.

In case of a converging lens, a light ray going through a typical converging lens that is normal to the lens and passes through its center, defines the optical axis. The bundle of rays passing through the lens cluster about this axis and may be well imaged by the lens, for example, if the source of the light is located as the focal plane of the lens, the image constituted by the light is projected to infinity.

Other collimating means, e.g., a diffractive optical element, may also provide imaging functionality, although for such means the optical axis is not well defined. The advantage of a converging lens is due to its symmetry about the optical axis, whereas the advantage of a diffractive optical element is due to its compactness.

Image generating device 42 can be either analog or digital device. An analog image generating device typically comprises a light source and at least one image carrier. Representative examples for a light source include, without limitation, a lamp (incandescent or fluorescent), one or more LEDs or OLEDs, and the like. Representative examples for an image carrier include, without limitation, a miniature slide, a reflective or transparent microfilm and a hologram. The light source can be positioned either in front of the image carrier (to allow reflection of light therefrom) or behind the image carrier (to allow transmission of light therethrough). Optionally and preferably, device 42 comprises a miniature CRT. Miniature CRTs are known in the art and are commercially available, for example, from Kaiser Electronics, a Rockwell Collins business, of San Jose, Calif.

A digital image generating device typically comprises at least one display. The use of certain displays may require, in addition, the use of a light source. Light sources suitable for digital image generating device include, without limitations, a lamp (incandescent or fluorescent), one or more LEDs (e.g., red, green and blue LEDs) or OLEDs, and the like. Suitable displays include, without limitation, rear-illuminated transmissive or front-illuminated reflective LCD, OLED arrays, Digital Light Processing™ (DLP™) units, miniature plasma display, and the like. A positive display, such as OLED or miniature plasma display, may not require the use of additional light source for illumination.

Transparent miniature LCDs are commercially available, for example, from Kopin Corporation, Taunton, Mass. Reflective LCDs are are commercially available, for example, from Brillian Corporation, Tempe, Ariz. Miniature OLED arrays are commercially available, for example, from eMagin Corporation, Hopewell Junction, N.Y. DLP™ units are commercially available, for example, from Texas Instruments DLP™ Products, Plano, Tex. The pixel resolution of the digital miniature displays varies from QVGA (320×240 pixels) or smaller, to WQUXGA (3840×2400 pixels).

System 40 is particularly useful for enlarging a field-of-view of devices having relatively small screens. For example, cellular phones and personal digital assistants (PDAs) are known to have rather small on-board displays. PDAs are also known as Pocket PC, such as the trade name iPAQ™ manufactured by Hewlett-Packard Company, Palo Alto, Calif. The above devices, although capable of storing and downloading a substantial amount of information in a form of single frames or moving images, fail to provide the user with sufficient field-of-view due to their small size displays.

System 40 can further comprises a data source 45 which can communicate with device 42 via a data source interface 43. Any type of communication can be established between interface 43 and data source 45, including, without limitation, wired communication, wireless communication, optical communication or any combination thereof. Interface 43 is preferably configured to receive a stream of imagery data (e.g., video, graphics, etc.) from data source 45 and to input the data into device 42. Many types or data sources are contemplated. According to a preferred embodiment of the present invention data source 45 is a communication device, such as, but not limited to, a cellular telephone, a personal digital assistant and a portable computer (laptop). Additional examples for data source 45 include, without limitation, television apparatus, portable television device, satellite receiver, video cassette recorder, digital versatile (DVD) player, digital moving picture player (e.g., MP4 player), digital camera, video graphic array (VGA) card, and many medical imaging apparatus, e.g., ultrasound imaging apparatus, digital X-ray apparatus (e.g., for computed tomography) and magnetic resonance imaging apparatus.

In addition to the imagery information, data source 45 may generates also audio information. The audio information can be received by interface 43 and provided to the user, using an audio unit (not shown).

According to various exemplary embodiments of the present invention, data source 45 provides the stream of data in an encoded and/or compressed form. In these embodiments, system 40 further comprises a decoder 33 and/or a decompression unit 35 for decoding and/or decompressing the stream of data to a format which can be recognized by device 21. Decoder 33 and decompression unit 35 can be supplied as two separate units or an integrated unit as desired.

System 40 preferably comprises a controller 37 for controlling the functionality of device 21 and, optionally and preferably, the information transfer between data source 45 and device 21. Controller 37 can control any of the display characteristics of device 21, such as, but not limited to, brightness, hue, contrast, pixel resolution and the like. Additionally, controller 37 can transmit signals to data source 45 for controlling its operation. More specifically, controller 37 can activate, deactivate and select the operation mode of data source 45. For example, when data source 45 is a television apparatus or being in communication with a broadcasting station, controller 37 can select the displayed channel; when data source 45 is a DVD or MP4 player, controller 37 can select the track from which the stream of data is read; when audio information is transmitted, controller 37 can control the volume of audio unit 31 and/or data source 45.

System 40 or a portion thereof (e.g., apparatus 20) can be integrated with a wearable device, such as, but not limited to, a helmet or spectacles, to allow the user to view the image, preferably without having to hold apparatus 20 by hand.

Apparatus 20 can also be used in combination with a vision correction device, for example, one or more corrective lenses for correcting, e.g., short-sightedness (myopia). In this embodiment, the vision correction device is preferably positioned between the eyes and apparatus 20.

System 40 or a portion thereof can also be adapted to be mounted on an existing wearable device. For example, apparatus 20 can be manufactured as a spectacles clip which can be mounted on the user's spectacles, or as a helmet accessory which can be mounted on a helmet's screen.

In any of the above embodiments, the system or apparatus can be provided as add-ons to a data source or any other device capable of transmitting imagery data. Additionally, the present embodiments can also be used as a kit which includes a data source, an image generating device, a binocular apparatus and optionally a wearable device. For example, when the data source is a communication device, the present embodiments can be used as a communication kit.

Any of the above embodiments can be successfully implemented by a judicious design of optical devices 22, and, more specifically the input/output optical elements and the light-transmissive substrates.

For example, as stated, the input and output optical elements can be linear diffraction gratings having identical periods and being in a parallel orientation. This embodiment is advantageous because it is angle-preserving. Specifically, the identical periods and parallelism of the linear gratings ensure that the relative orientation between light rays exiting the substrate is similar to their relative orientation before the impingement on the input optical element. In the embodiments in which apparatus 20 is a binocular optical apparatus for transmitting an image, the angle preserving configuration ensures that light rays, emanating from a particular point of the image, reach both eyes as two parallel light rays. Thus, such light rays can be viewed by both eyes as arriving from the same angle in space. It will be appreciated that with such configuration viewing convergence is easily obtained without eye-strain or any other inconvenience to the viewer, unlike the prior art binocular devices in which relative positioning and/ or relative alignment of the optical elements is necessary.

According to a preferred embodiment of the present invention, in each optical device the ratio between the wavelength, $\lambda$, of the respective portion of the light and the period, d, of the linear diffraction grating for is larger than or equal a unity.

$$\lambda/d \geq 1. \quad (EQ.\ 7).$$

In another embodiment, the ratio $\lambda/d$ is smaller than the refraction index, $n_S$, of the light-transmissive substrate. More specifically, d and $n_S$ can be selected to comply with the following inequality:

$$d > \lambda/(n_S p), \quad (EQ.\ 8)$$

where p is a predetermined parameter which is smaller than 1.

The value of p is preferably $\sin(\alpha_D^{MAX})$, where $\alpha_D^{MAX}$ is a maximal diffraction angle of the respective portion of the light. Because there are generally no theoretical limitations on $\alpha_D^{MAX}$ (apart from a requirement that its absolute value is smaller than 90°), it may be selected according to any practical considerations, such as cost, availability or geometrical limitations which may be imposed by a certain miniaturization necessity.

Hence, in one embodiment, further referred to herein as the "at least one hop" embodiment, $\alpha_D^{MAX}$ is selected so as to allow at least one reflection within a predetermined distance x which may vary from about 25 mm to about 80 mm.

For example, for a glass light-transmissive substrate, with an index of refraction of $n_S=1.5$ and a thickness of 2 mm, a single total internal reflection event of a light having a wavelength of 465 nm within a distance x of 34 mm, corresponds to $\alpha_D^{MAX}=83.3°$.

In another embodiment, further referred to herein as the "flat" embodiment, $\alpha_D^{MAX}$ is selected so as to reduce the number of reflection events within the light-transmissive substrate, e.g., by imposing a requirement that all the diffraction angles will be sufficiently small, say, below 80°.

In an additional embodiment, particularly applicable to those situations in the industry in which the refraction index of the light-transmissive substrate is already known (for example when the apparatus 20 is intended to operate synchronically with a given device which includes a specific light-transmissive substrate), Equation 7 may be inverted to obtain the value of p hence also the value of $\alpha_D^{MAX}=\sin^{-1}p$.

According to a preferred embodiment of the present invention, for each sub-spectrum, the gratings period is preferably selected to comply with Equation 6, for the shortest wavelength of the sub-spectrum, and with Equation 7, for the longest wavelength of the sub-spectrum. Specifically:

$$\lambda_S/(n_s p) \leq d \leq \lambda_L, \quad (EQ.\ 9)$$

where $\lambda_S$ and $\lambda_L$ are, respectively, the shortest and longest wavelengths of the respective sub-spectrum. Note that it follows from Equation 8 that the index of refraction of the substrate should satisfy, under these conditions, $n_s p \geq \lambda_L/\lambda_S$.

The grating period can also be smaller than the sum $\lambda_S + \lambda_L$, for example:

$$d = \frac{\lambda_S + \lambda_L}{n_S \sin(\alpha_D^{MAX}) + n_A}. \quad (EQ.\ 10)$$

According to a preferred embodiment of the present invention the linear grating of each of the optical elements can be recorded by means of holographic techniques, by means of computer-generated masks and lithographic techniques, by direct writing techniques, by embossing or etching or by any other procedure known in the art.

It should be understood that the light-transmissive substrate can be manufactured from any material which enables transmission of light therethrough, such as, but not limited to, glass or transparent polymer in the case of visible light. In any case, the index of refraction of the light-transmissive substrate material should be larger than the index of refraction of air, or any other material bounding the light-transmissive substrates.

The preferred technical details of any embodiment of the invention are as follows. A thickness, t, of the light-transmissive substrate is between about 0.5 mm and about 5 mm, more preferably from about 2 mm to about 3 mm. In various exemplary embodiments of the invention $t > 10\lambda_L$. The width/length of the light-transmissive substrate is preferably from about 10 mm to about 100 mm. A typical width/length of the input and output optical elements ranges for different optical applications such as the near eye display application described in U.S. Pat. No. 5,966,223 from about 5 mm to about 20 mm. The preferred horizontal field-of-view is, as stated, of at least 16 degrees, more preferably at least 20 degrees most preferably at least 24 degrees, in inclusive representation. The preferred spectrum of light spans at least 100 nm. More specifically, the shortest wavelength of the spectrum $\lambda_B$ generally corresponds to a blue light having a typical wavelength of between about 400 to about 500 nm, the longest wavelength $\lambda_R$ generally corresponds to a red light having a typical wavelength of between about 600 to about 700 nm.

It is appreciated that certain features of the invention, which are, for clarity, described in the context of separate embodiments, may also be provided in combination in a single embodiment. Conversely, various features of the invention, which are, for brevity, describe in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An optical apparatus for transmitting light generated by a chromatic light source, the light having a spectrum of wavelengths, the apparatus comprising a plurality of optical devices, each having a light-transmissive substrate formed with:
   (a) at least one input optical element designed and constructed to diffract a spectral portion of the light such that said portion is entrapped within said substrate via total internal reflection, and
   (b) at least one output optical element which comprises a plurality of sections, each section of said plurality of sections being characterized by a different diffraction efficiency, for diffracting a respective portion of the light out of said light-transmissive substrate,
   wherein each spectral portion corresponds to a sub-spectrum of the spectrum and wherein at least two different spectral portions propagate in separate substrates.

2. The apparatus of claim 1, wherein each optical device is a planar optical device engaging a different plane.

3. The apparatus of claim 1, wherein input optical elements of different light-transmissive substrates have at least a partial overlap therebetween.

4. The apparatus of claim 1, being characterized by a predetermined field-of-view, wherein each optical device of said plurality of optical devices is also characterized by said predetermined field-of-view.

5. The apparatus of claim 4, wherein said horizontal field-of-view is of at least 16 degrees.

6. The apparatus of claim 4, wherein said horizontal field-of-view is of at least 20 degrees.

7. The apparatus of claim 4, wherein said horizontal field-of-view is of at least 24 degrees.

8. The apparatus of claim 1, wherein said at least one output optical element is designed and constructed to diffract said respective portion of the light out of said light-transmissive substrate, while allowing other portions of the light to pass through said at least one output optical element with minimal or no diffraction.

9. The apparatus of claim 8, wherein output optical elements of different light-transmissive substrates have at least a partial overlap therebetween.

10. The apparatus of claim 8, wherein said minimal diffraction is characterized by a diffraction efficiency of less than 10 percents.

11. The apparatus of claim 8, wherein each of said at least one input optical element and said at least one output optical element of each optical device is designed and constructed such that light rays are diffracted into said optical device by said at least one input optical element, and diffracted out of said optical device by said at least one output optical element such that the relative orientation between light rays exiting said light transmissive substrate is similar to a relative orientation between respective light rays before impinging on said at least one input optical element.

12. The apparatus of claim 8, wherein said diffraction efficiencies are selected to reduce brightness non-uniformities of a predetermined portion of the light diffracted said at least one output optical element.

13. The apparatus of claim 8, wherein each of said at least one output optical element is independently a linear diffraction grating.

14. The apparatus of claim 13, wherein said linear diffraction grating of said at least one input optical element and said linear diffraction grating of said at least one output optical element have substantially identical periods.

15. The apparatus of claim 13, wherein said linear diffraction grating of said at least one input optical element and said linear diffraction grating of said at least one output optical element are substantially parallel.

16. The apparatus of claim 13, wherein a ratio between a wavelength of said respective portion of the light and a period characterizing said linear diffraction gratings is larger than or equal a unity.

17. The apparatus of claim 13, wherein a ratio between a wavelength of said respective portion of the light and a period characterizing said linear diffraction gratings is smaller than a refraction index of said light-transmissive substrate.

18. The apparatus of claim 1, wherein said plurality of optical devices comprises a first optical device and a second optical device.

19. The apparatus of claim 1, wherein said plurality of optical devices comprises a first optical device, a second optical device and a third optical device.

20. The apparatus of claim 1, wherein said diffraction efficiencies of said plurality of sections form a harmonic series.

21. The apparatus of claim 1, wherein a number of said sections equals a characteristic number of reflections of a light ray of a respective sub-spectrum while propagating along said output optical element.

22. The apparatus of claim 1, wherein said at least one output optical element comprises a first output optical element and a second output optical element, said first and said second output optical elements having a separation therebetween.

23. The apparatus of claim 22, wherein said at least one input optical element, said first output optical element and said second output optical element are designed and constructed such that each light ray of said respective portion of the light is bifurcated by said input optical element into two secondary light rays each propagating within said light transmissive substrate in the direction of one output optical element, said two secondary light rays exiting said light-transmissive substrate in a form of two substantially parallel light rays.

24. The apparatus of claim 1, wherein each of said at least one input optical element is independently a linear diffraction grating.

25. The apparatus of claim 1, further comprising a collimator for collimating the light.

26. The apparatus of claim 25, wherein said collimator comprises a converging lens.

27. The apparatus of claim 25, wherein said collimator comprises a diffractive optical element.

28. The apparatus of claim 1, wherein a maximal diffraction angle characterizing said total internal reflection equals about 80 degrees with respect to a perpendicular orientation to said light-transmissive substrate.

29. The apparatus of claim 1, wherein a maximal diffraction angle characterizing said total internal reflection is selected so as to allow at least one reflection over a predetermined distance in said light-transmissive substrate.

30. The apparatus of claim 29, wherein said predetermined distance is from about 25 mm to about 80 mm.

31. The apparatus of claim 1, wherein a thickness of said light-transmissive substrate is from about 0.5 mm to about 5 mm.

32. The apparatus of claim 1, wherein a thickness of said light-transmissive substrate is larger than ten times a shortest wavelength of the spectrum.

33. The apparatus of claim 1, wherein said light-transmissive substrate is selected from the group consisting of glass and a transparent polymer.

34. An optical apparatus according to claim 1 wherein the input optical elements in the substrates of the plurality of optical devices are aligned such that light from the light source passes through a first input optical element of a first optical device before impinging on a second optical element of a second optical device.

35. The apparatus according to claim 1, wherein said plurality of optical devices are separated by air spacing.

36. The apparatus according to claim 1, wherein said plurality of optical devices are parallel to each other.

37. A system for providing a chromatic image to a user, the image being constituted by light having a spectrum of wavelengths, the system comprising:
(a) an optical apparatus which comprises a plurality of optical devices, each having a light-transmissive substrate formed with:
at least one diffractive input optical element designed and constructed to diffract a spectral portion of the light such that said portion is entrapped within said substrate via total internal reflection, and
at least one diffractive output optical element which comprises a plurality of sections, each section of said plurality of sections being characterized by a different diffraction efficiency, for diffracting said portion out of said substrate,
wherein each portion corresponds to a sub-spectrum of the spectrum and wherein at least two different portions propagate in separate substrates; and
(b) a chromatic image generating device for providing said optical apparatus with the image.

38. The system of claim 37, wherein each optical device is a planar optical device engaging a different plane.

39. The system of claim 37, wherein input optical elements of different light-transmissive substrates have at least a partial overlap therebetween.

40. The system of claim 37, wherein said at least one output optical element is designed and constructed to diffract a respective portion of the light out of said light-transmissive substrate while allowing other portions of the light to pass through said at least one output optical element with minimal or no diffraction.

41. The system of claim 37, wherein output optical elements of different light-transmissive substrates have at least a partial overlap therebetween.

42. The system of claim 37, being characterized by a predetermined field-of-view, wherein each optical device of said plurality of optical devices is also characterized by said predetermined field-of-view.

43. The system of claim 37, wherein said plurality of optical devices comprises a first optical device and a second optical device.

44. The system of claim 37, wherein said plurality of optical devices comprises a first optical device, a second optical device and a third optical device.

45. A system according to claim 37 wherein the input optical elements in the substrates of the plurality of optical devices are aligned such that light from the light source passes through a first input optical element of a first optical device before impinging on a second optical element of a second optical device.

46. The apparatus according to claim 37, wherein said plurality of optical devices are separated by air spacing.

47. The apparatus according to claim 37, wherein said plurality of optical devices are parallel to each other.

48. A method of transmitting light having a spectrum of wavelengths, the method comprising:
decomposing the light into a plurality of portions respectively corresponding to different sub-spectra of the spectrum, said decomposing is by diffracting at least two portions which correspond to mutually exclusive sub-spectra into separate light transmissive substrates; and
transmitting each portion of the light via total internal reflection within a respective light transmissive substrate.

49. The method of claim 48, wherein each a light-transmissive substrate is formed with at least one input optical element which diffracts a respective portion of the light into said light-transmissive substrate, to allow propagation of said respective portion in said light-transmissive substrate via total internal reflection.

50. The method of claim 49, further comprising recomposing said plurality of portions.

51. The method of claim 50, wherein said decomposing, transmitting and recomposing is done in a manner such that a field-of-view characterizing the light is preserved.

52. The method of claim 49, wherein said recomposing comprises diffracting each portion of the light out of a respective light light-transmissive substrate.

53. The method of claim 52, wherein each light-transmissive substrate is further formed with at least one output optical element which diffracts a respective portion of the light out of said light-transmissive substrate and allows other portions of the light to pass through said at least one output optical element with minimal or no diffraction.

54. The method of claim 48, wherein said separate light transmissive substrates comprise a first light transmissive substrate and a second light transmissive substrate, wherein said sub-spectra comprise a first sub-spectrum and a second sub-spectrum, and wherein said first sub-spectrum is transmitted within said first light transmissive substrate and said second sub-spectrum is transmitted within said second light transmissive substrate.

55. The method of claim 48, wherein said separate light transmissive substrates comprise a first light transmissive substrate, a second light transmissive substrate and a third light transmissive substrate, wherein said sub-spectra comprise a first sub-spectrum, a second sub-spectrum and a third sub-spectrum, and wherein said first sub-spectrum is transmitted within said first light transmissive substrate, said second sub-spectrum is transmitted within said second light transmissive substrate and said third sub-spectrum is transmitted within said third light transmissive substrate.

56. An optical apparatus for transmitting light having a spectrum of wavelengths, comprising a plurality of optical devices, each having a different light-transmissive substrate formed with:
  at least one diffractive input optical element for entrapping a spectral portion of the light within said substrate via total internal reflection, and
  two output optical elements having a separation therebetween and configured for diffracting said portion out of said substrate;
  said optical device being designed and constructed such that said portion is bifurcated by said at least one input optical element into two secondary light rays, each propagating within said substrate in the direction of one output optical element.

57. An optical apparatus according to claim 56 wherein the input optical elements in the substrates of the plurality of optical devices are aligned such that light from the light source passes through a first input optical element of a first optical device before impinging on a second optical element of a second optical device.

58. The apparatus according to claim 56, wherein said plurality of optical devices are separated by air spacing.

59. The apparatus according to claim 56, wherein said plurality of optical devices are parallel to each other.

60. An optical apparatus for transmitting light generated by a chromatic light source, the light having a spectrum of wavelengths, the apparatus comprising a plurality of optical devices designed and constructed to decompose the light into a plurality of portions respectively corresponding to different sub-spectra of the spectrum, such that each portion of said plurality of portions is efficiently transmitted within a different optical device,
  wherein each optical device is a planar optical device engaging a different plane; and
  wherein each optical device comprises a light-transmissive substrate formed with at least one input optical element designed and constructed to diffract a respective portion of the light into said light-transmissive substrate, to allow propagation of the light within said light-transmissive substrate via total internal reflection;
  wherein each spectral portion corresponds to a sub-spectrum of the spectrum, and wherein at least two mutually exclusive spectral portions propagate in separate substrates.

61. An optical apparatus according to claim 60 wherein the input optical elements in the substrates of the plurality of optical devices are aligned such that light from the light source passes through a first input optical element of a first optical device before impinging on a second optical element of a second optical device.

62. The apparatus according to claim 60, wherein said plurality of optical devices are separated by air spacing.

63. The apparatus according to claim 60, wherein said plurality of optical devices are parallel to each other.

* * * * *